(12) United States Patent
Dyson et al.

(10) Patent No.: US 6,193,787 B1
(45) Date of Patent: Feb. 27, 2001

(54) DOMESTIC VACUUM CLEANER AND AN ATTACHMENT THEREFOR

(75) Inventors: James Dyson, Wiltshire; James Wilson Braithwaite, Bath, both of (GB)

(73) Assignee: Notetry Limited, Wiltshire (GB)

( * ) Notice: Subject to any disclaimer, the term of this patent is extended or adjusted under 35 U.S.C. 154(b) by 0 days.

(21) Appl. No.: 09/269,158

(22) PCT Filed: Sep. 10, 1997

(86) PCT No.: PCT/GB97/02434

§ 371 Date: Jul. 12, 1999

§ 102(e) Date: Jul. 12, 1999

(87) PCT Pub. No.: WO98/10691

PCT Pub. Date: Mar. 19, 1998

(30) Foreign Application Priority Data

Sep. 16, 1996 (GB) .................................... 9619328

(51) Int. Cl.[7] ................. B01D 45/12; B04C 5/26
(52) U.S. Cl. ................. 95/271; 55/345; 55/429; 55/DIG. 2
(58) Field of Search ........ 55/428, 429, DIG. 2, 55/DIG. 3, 345; 95/271; 15/352, 353

(56) References Cited

U.S. PATENT DOCUMENTS

| 4,581,050 | * | 4/1986 | Krantz ................... 55/429 |
| 4,826,515 | * | 5/1989 | Dyson ................... 55/429 |
| 4,963,172 | * | 10/1990 | DeMarco ................ 55/429 |
| 5,363,535 |   | 11/1994 | Rench et al. . |

FOREIGN PATENT DOCUMENTS

| 0 318 388 A1 | 5/1989 | (EP) . |
| WO 80/02651 | 12/1980 | (WO) . |

* cited by examiner

*Primary Examiner*—David A. Simmons
*Assistant Examiner*—Robert A. Hopkins
(74) *Attorney, Agent, or Firm*—Morrison & Foerster LLP

(57) ABSTRACT

The invention provides a domestic vacuum cleaner comprising separating means and particle collecting means, the particle collecting means comprising a side wall (22) and a base (20), wherein the base (20) is releasably connected to the side wall (22) to facilitate disposal of particles separated from the airflow by the separating means and collected in the particle collecting means and further comprises sealing means (44) for sealing the said separated particles within the base (20).

41 Claims, 4 Drawing Sheets

DOMESTIC VACUUM CLEANER AND AN ATTACHMENT THEREFOR

The invention relates to domestic vacuum cleaning apparatus. The invention also relates to an attachment therefor and to a method of disposing of particles separated from an airflow by such apparatus.

Vacuum cleaners generally consist of, inter alia, means for separating dirt or dust from an airflow and means for collecting separated dirt or dust inside the apparatus. The separating and collecting means can be integral, for example in the form of a filter bag, or can be effectively separate such as in a cyclonic vacuum cleaner. An example of a cyclonic vacuum cleaner is fully described in European Patent No. 0 134 654B. This document describes apparatus consisting of two concentric cyclones arranged in series, the upstream cyclone having a lower efficiency than the downstream cyclone. It is also possible to construct cyclonic vacuum cleaning apparatus including only a single cyclone. In cyclonic vacuum cleaners, the separated dirt and dust is usually collected in a chamber or bin which is removable for emptying purposes. In bag-type vacuum cleaners, the bag is removable for disposal or emptying.

A major problem relating to known vacuum cleaners is that, whenever the dirt collecting apparatus is removed for disposal or emptying, there is a certain amount of exposure of collected dirt and dust to the atmosphere. This can be problematic in some cases, particularly when the user of the vacuum cleaner is prone to allergies which are aggravated by the inhalation of dust particles. Some attempts have been made to reduce the amount of exposure of the collected dirt and dust particles to the user of the vacuum cleaner (see, for example, U.S. Pat. Nos. 3,653,190, 4,581,051, 5,090,976 and 5,145,499) but the problem remains acute in most vacuum cleaners, particularly to domestic vacuum cleaners where factors such as size, weight and maneuverability place restrictions on developments which can acceptably be made.

It is an object of the present invention to provide apparatus for separating particles from an airflow having means for reducing or eliminating the amount of collected dirt and dust released into the atmosphere during emptying. It is a further object of the invention to provide apparatus for separating particles from an airflow which is suitable for use by allergy sufferers.

The provision of sealing means in a removable base of the particle collecting means in a vacuum cleaner allows a user to seal the dirt and dust collected by the vacuum cleaner into a removable portion of the apparatus before the portion is removed. The amount of dirt and dust collected by the apparatus and subsequently re-released into the atmosphere is thereby minimised or eliminated. The preferred arrangement of a base having extendable walls allows the replaceable portion of the apparatus to be kept as small as possible in a first configuration so as to facilitate transport and storage. The arrangement of a flexible tubular sleeve forming the sealing means is simple and effective, thus keeping costs to a minimum and maximising ease of use.

Many further advantages of the invention will become apparent from the following description of two specific embodiments of the invention. The embodiments of the invention will now be described, by way of example only, with reference to the accompanying drawings, wherein:

FIGS. 1b and 1c are front and side views respectively of a complete domestic vacuum cleaner incorporating the part of FIG. 1a;

Figure 1A:
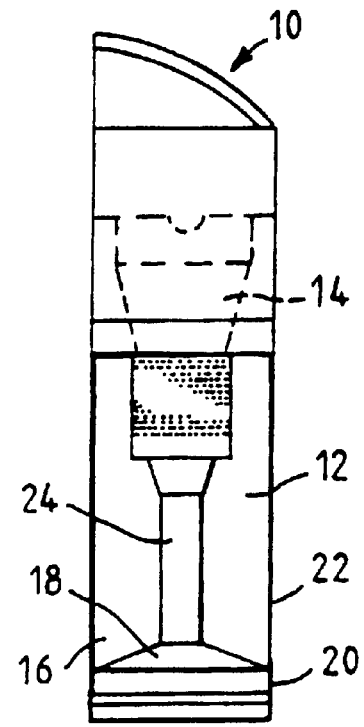
FIG. 1a is a schematic diagram of part of a domestic cyclonic vacuum cleaner incorporating a first embodiment of the invention.
Figure 1B:
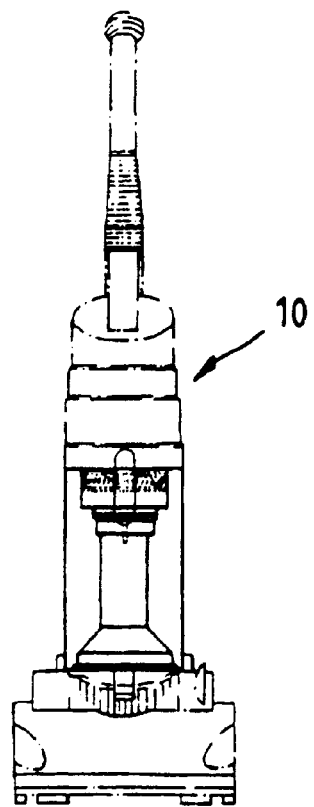
Figure 1C:
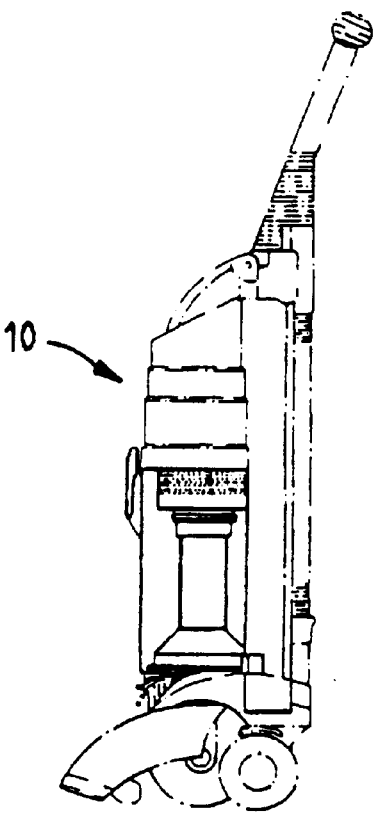

FIG. 1a shows part of vacuum cleaning apparatus 10 of the dual-cyclonic type fully described in European Patent No. 0 134 654. FIG. 1a shows only the dust separating apparatus and dust collecting apparatus for clarity. The vacuum cleaning apparatus, if it were an upright vacuum cleaner, would normally further include a ground engaging cleaning head, a motor or fan unit, supporting wheels, a handle and a hose or wand, the hose or wand doubling as the handle if required. A cylinder vacuum cleaner would normally include a motor or fan unit, supporting wheels, a hose and wand and a cleaner head in addition to the dust separating apparatus. These additional features are illustrated in FIGS. 1b and 1c but they do not form part of the present invention and will be described no further here. However, it will be appreciated that the invention hereinafter described may be incorporated into both upright and cylinder vacuum cleaners.

The apparatus 10 essentially comprises a primary or low efficiency cyclone 12 designed to remove larger debris from the airflow and a secondary or high efficiency cyclone 14 designed to remove fine particles from the airflow. The cyclones are arranged concentrically and in series. In operation, dirt-laden air passes initially through the primary cyclone 12 and subsequently through the secondary cyclone 14 in order to effect separation of dirt and dust particles from the airflow. Particles separated from the airflow by the primary cyclone are collected in the dust collecting area 16 and dirt and dust particles separated from the airflow by the secondary cyclone 14 are collected in the dust collecting area 18. Both cyclones 12,14 are closed at their lower ends by a base 20. The base 20 is releasably connected to the side wall 22 of the primary cyclone 12 in the manner described below.

Figure 2A:
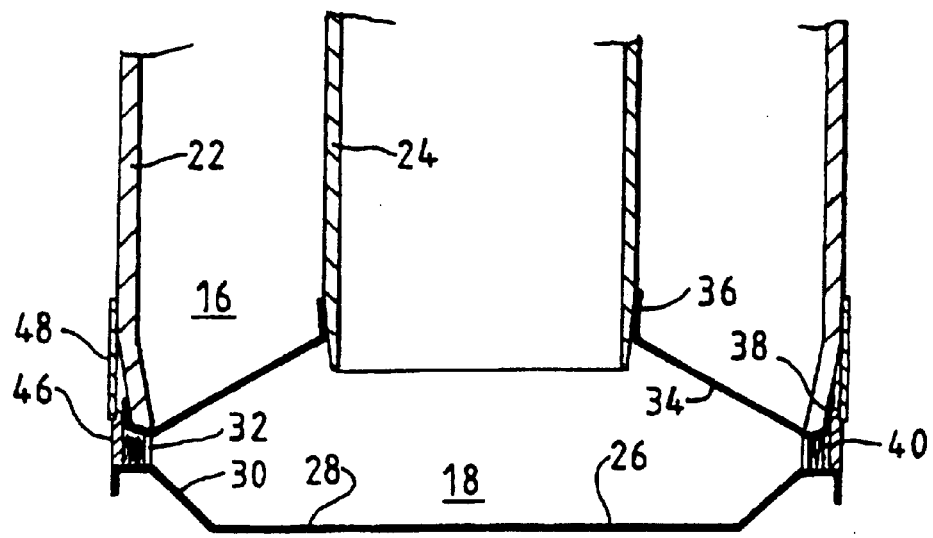
FIG. 2a is a sectional view of part of FIG. 1 shown on an enlarged scale and in a first configuration.

FIG. 2a shows the base 20 in greater detail. The base 20 is shown in a first configuration which is utilised during normal operation of the apparatus 10. The base 20 is shaped and configured to co-operate with the side wall 22 of the primary cyclone 12 and also with a tubular extension 24 of the secondary cyclone 14. The side wall 22 and tubular extension 24 are each generally cylindrical in shaped and have a slight inward taper at the lower end thereof. Specifically, the tubular extension 24 of the secondary cyclone 14 is arranged so as to extend sufficiently far in an axial direction to meet the base 20.

The base 20 comprises a lower portion 26 which consists of a generally circular plate 28 having an annular inclined portion 30 connecting the circular plate 28 to an annular recess portion 32 or channel which is open on its side remote from the centre of the circular plate. A second annular inclined portion 34 extends upwardly and inwardly from the inner side of the annular recess portion 32 and terminates in an annular inner collar 36. The annular inner collar is dimensioned so as to co-operate with the tapered lower end of the tubular extension 24 of the secondary cyclone 14. The lower portion 26 can carry, if desired, an upwardly extending annular tube or ring (not shown) designed to prevent fine dust particles collected in the dust collecting area 18 from moving towards the centre of the lower portion 26. This reduces the risk of the particles becoming re-entrained in the airflow.

The annular recess portion 32 defines a recess for receiving the flexible extendable walls which will be described later. The annular recess portion 32 also carries an upwardly extending annular outer collar 38 which is tapered outwardly very slightly and is dimensioned so as to co-operate sealingly with the tapered lower end of the side wall 22 of the primary cyclone 12. The lower portion 26 is preferably formed from styrene, polyethylene, polypropylene or other suitable material by moulding or other suitable manufacturing means. The annular inner collar 36 and annular outer collar 38 are both provided with sufficient resilience to enable the connection between them and the respective side wall 22 or tubular extension 24 with which they co-operate to be airtight.

Fixedly connected to the lower potion 26 in the area of the annular recess portion 32 is a tubular flexible sleeve 40. The flexible sleeve 40 comprises two portion, a lower dust containing portion 42 and an upper sealing portion 44. These portions are more clearly illustrated in FIG. 2b. The containing portion 42 and the sealing portion 44 are separated by an intermediate collar 46. The flexible sleeve 40 is manufactured from a highly flexible plastics material which is impermeable to dirt and dust particles and which is of sufficiently high strength to enable the flexible sleeve to be very thin. The dust containing portion 42 at least is required to be contained within the annular recess portion 32 during normal operation of the vacuum cleaning apparatus. The sealing portion 44 of the flexible sleeve 40 is also required to be stored within the confines of the base 20, preferably also within the annular recess portion 32. The intermediate collar 46 is dimensioned so as to close the recess portion 32 when it is located adjacent the open side thereof (see FIG. 2a).

The upper end of the sealing portion 44 of the flexible sleeve 40 is fixedly connected to a connecting collar 48. The connecting collar 48 is generally annular in shape and is dimensioned to co-operate with the cylindrical portion of the side wall 22 of the primary cyclone 12 and to form a seal therewith. The lower portion 26 is held against the connecting collar 48 by retaining means (not shown), for example in the form of a strip of adhesive tape located over the join between the lower portion 26 and the connecting collar 48, by a removable, tear-off plastics strip or by a frictional press fit between the relevant portions. Alternative temporary retaining means can also be provided.

The dust collecting area 16 of the primary cyclone is defined between the side wall 22 of the primary cyclone, the tubular extension 24 of the secondary cyclone and the second annular inclined portion 34 of the lower portion 26 of the base 20. The dust collecting area 18 of the secondary cyclone 24 is defined between the circular plate 28, the annular inclined portion 30 and the second annular inclined portion 34. These are the areas in which the dirt and dust separated by the cyclones 12,14 will accumulate. In the configuration shown in FIG. 2a, which is the configuration adopted when the vacuum cleaning apparatus 10 is in use, the flexible sleeve 40 is entirely contained within the annular recess portion 32 and held therein by the intermediate collar 46, the annular outer collar 38 is in sealing co-operation with the lower edge of the side wall 22 of the primary cyclone and the annular inner collar 36 is in sealing co-operation with the lower edge of the tubular extension 24 of the secondary cyclone 14. The connecting collar 48 is sealingly held by friction against the side wall 22. The containment of the flexible sleeve 40 within the recess portion 32 avoids the flexible sleeve 40 being exposed to the airflow when the cleaner is in use and eliminates any risk of the sleeve becoming damaged. The unit operates in precisely the same manner as similar vacuum cleaning apparatus having a bin wherein the base is integrally formed with the side walls.

Figure 2B:
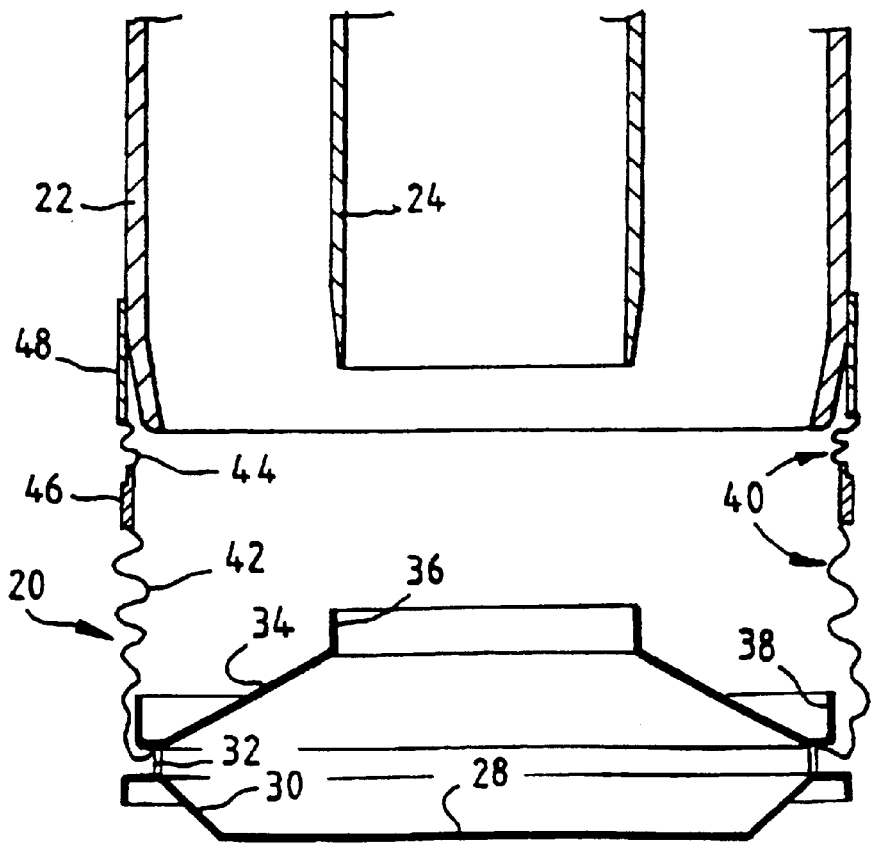
FIG. 2b is a sectional view similar to FIG. 2a, but in a second configuration.

FIG. 2b shows the apparatus of FIG. 2a in a second configuration. In this Figure, some of the components of the base 20 are more clearly shown. In this configuration, the connecting collar 48 is still attached to the side wall of the primary cyclone 12. However, the lower portion 26 has been released from the side wall 22 and tubular extension 24 so that the flexible sleeve 40 is allowed to extend. The dust containing portion 42 of the flexible sleeve 40 remains rigidly connected to the annular recess portion 32 and the intermediate collar 46 and the sealing portion 44 remains rigidly connected to the intermediate collar 46 and the connecting collar 48. The flexible sleeve 40 is preferably connected to the recess portion 32, the intermediate collar 46 and the connecting collar 48 by welding. However, the extension of the flexible sleeve 40 allows the volume of the base 20 to be expanded considerably. This allows dirt and dust collected in areas 16 and 18 to be removed from the dust separating apparatus for emptying purposes. The axial length of the dust containing portion 42 of the flexible sleeve 40 is such that nay and all dust collected in dust collecting area 16 can be contained therein, i.e. below the intermediate collar 46.

The sealing portion 44 of the flexible sleeve 40 has an axial length sufficient to allow the sealing portion 44 to be twisted to effect sealing of the dust containing portion 42 from the atmosphere. This sealing must be achievable without the need to remove the connecting collar 48 from the side wall 22.

Figure 3:
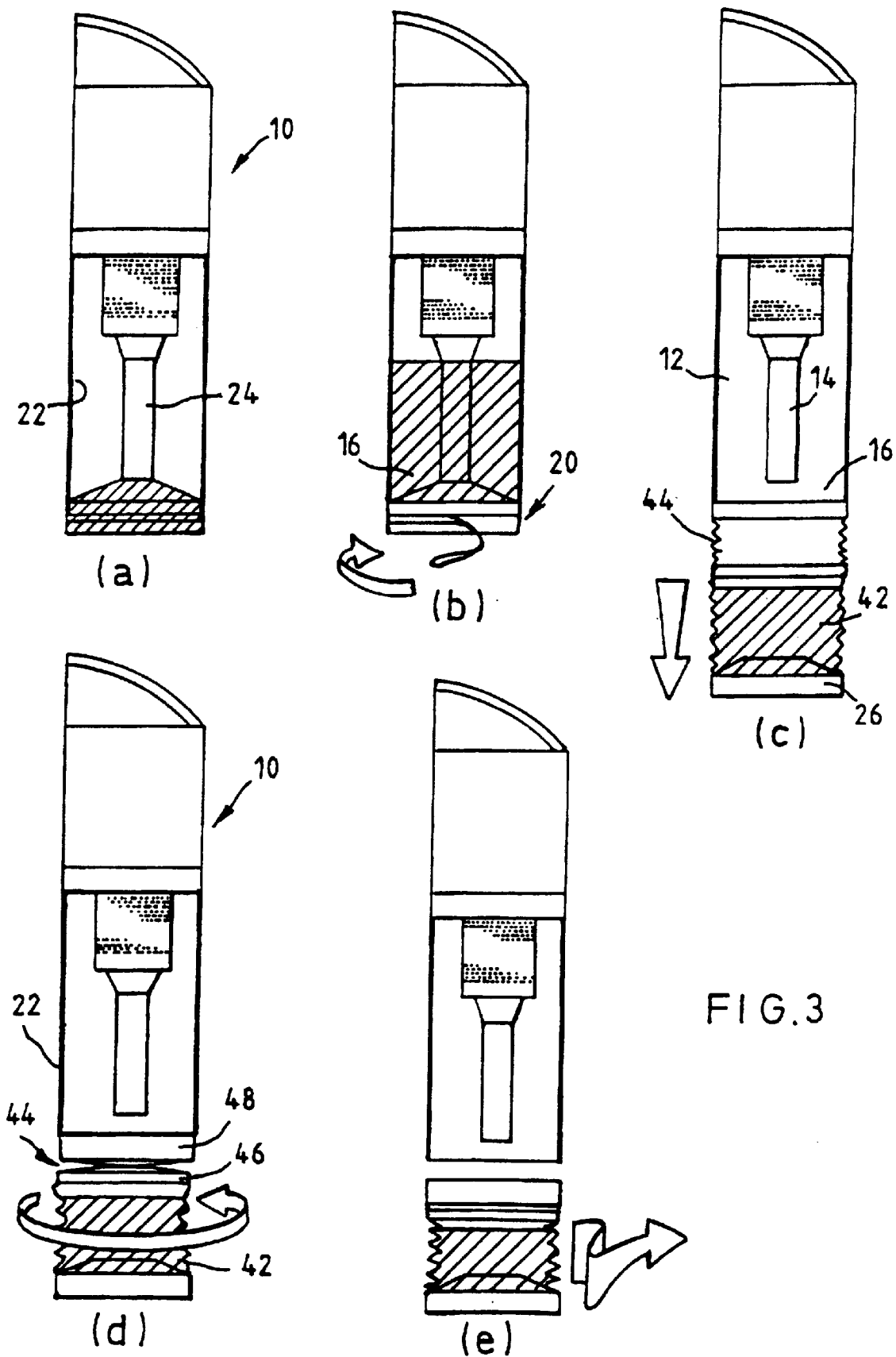
FIGS. 3a to 3e illustrate a method of use of the apparatus shown in FIGS. 1 and 2.

The intended method of emptying the apparatus 10 will now be described with reference to FIG. 3. FIG. 3a shows the apparatus 10 with the base 20 connected to the side walls 22,24 and ready for normal operation. The base 20 is connected to the side walls 22,24 merely by push fitting the collar 48 over the side wall 22. The tapered lower ends of the side walls 22,24 assist in the automatic location and sealing of the annular inner collar 36 and the annular outer collar 38 to form an airtight seal in both regions. The suction produced by the motor or fan unit of the apparatus 10 discourages the base 20 from becoming dislodged in view of the underpressure which is created in each cyclone 12,14.

When the dust collecting area 16,18 are full, the apparatus 10 must be emptied. The motor or fan unit is switched off for emptying purposes. The apparatus 10 may be removed from the main body of the vacuum cleaner if this is possible and desired. Next, the lower portion 26 must be released from the connecting collar 48 to allow expansion of the base 20. The effecting of the release will depend upon the means by which the lower portion is retained adjacent the connecting collar 48. The lower portion 26 can, as explained above, be retained adjacent the connecting collar 48 by means of adhesive tape, by a removable tear-off plastics strip or by a frictional press fit. If a frictional press fit is used, the lower portion 26 will be released from the connecting collar 48 by twisting or by the application of an axial or radial force, i.e. by manual mean, whilst holding the connecting collar 48 on the side wall 22. If the lower portion 26 is retained adjacent the connecting collar 48 by means of adhesive tape or a tear-off strip, the adhesive tape or strip is merely removed as indicated in FIG. 3b. The shaded area in FIG. 3b indicates the area in which dirt and dust particles are located at this stage of the method.

The release of the retaining means allows the base 20 to be expanded as indicated in FIG. 3c. The lower portion 26 is allowed to drop away from the cyclones 12,14. Because the dirt and dust particles separated by the secondary cyclone 14 and accumulated in dust collecting area 18 are contained substantially wholly within the lower portion 26, the secondary cyclone 14 is automatically emptied. Also, because the second annular inclined portion 34 which supports the dirt and dust particles collected in the dust collecting area 16 has been removed along with the lower portion 26, the dirt and dust collected in area 16 then falls into the dust containing portion 42 of the base 20 leaving the dust collecting area 16 completely empty. Gentle tapping of the side wall 22 can encourage dirt and dust particles to fall if necessary.

In order to seal the separated dirt and dust within the dust containing portion 42, the sealing portion 44 is brought into operation. In order to effect sealing, the intermediate collar 46, together with the dust containing portion 42, is rotated with respect to the connecting collar 48 about the longitudinal axis of the apparatus 10, as shown in FIG. 3d. Sufficient twisting of the intermediate collar 46 causes the sealing portion 44 of the flexible sleeve to twist and completely seal the separated dirt and dust within the base 20. This step is carried out before the connecting collar 48 is released from the side wall 22, as shown in FIG. 3e. The direction of rotation of the intermediate collar 46 is immaterial. When the sealing portion 44 has been twisted sufficiently to produce a seal, the connecting collar 48 can be released from the side wall 22 as shown in FIG. 3e. The user must take some care to retain the seal by preventing the untwisting of the sealing portion 44. Alternatively, means can be used to retain the relative rotational position of the intermediate collar 46 with respect to the connecting collar 48. Adhesive tape can be applied between the two collars or, alternatively, interengaging means can be provided between the intermediate collar 46 and the connecting collar 48 to allow the two collars to be connected. Whilst the prevention of relative rotation of the two collars is important during disposal of the base 20, it should be remembered that the disposal of the base will inevitably take place quickly and therefore the retaining means need not be particularly enduring.

Figure 4A:
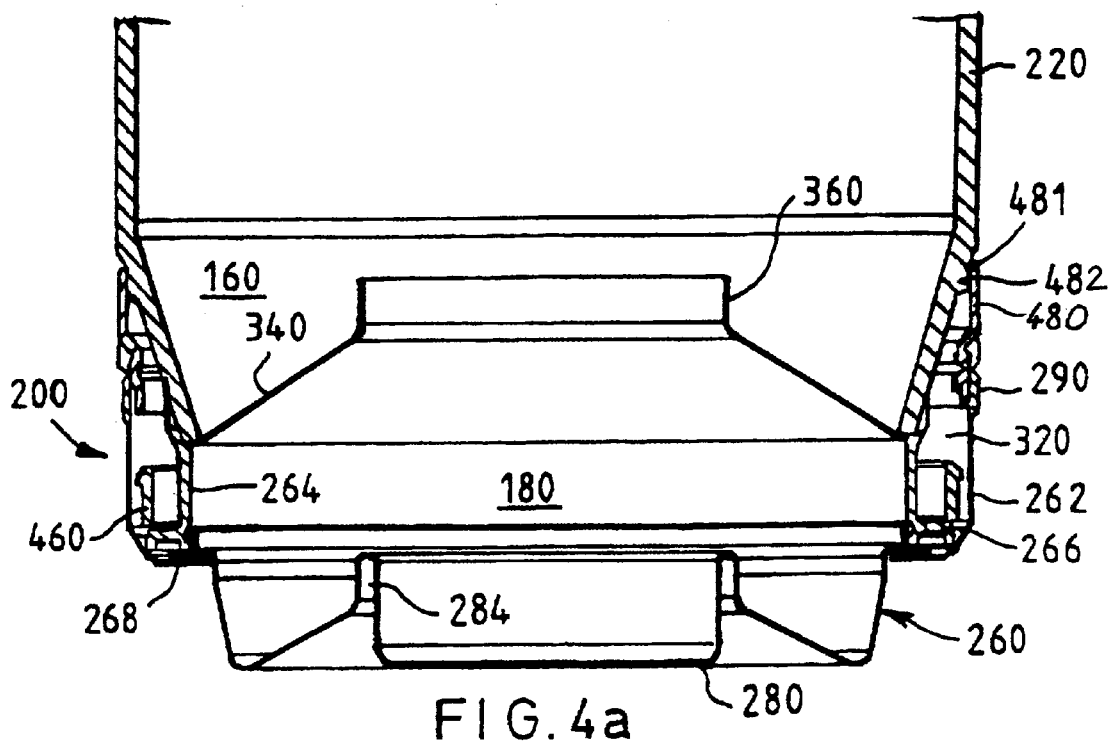
FIG. 4a is a sectional view, similar to FIG. 2a, of a second embodiment of the invention.
Figure 4B:
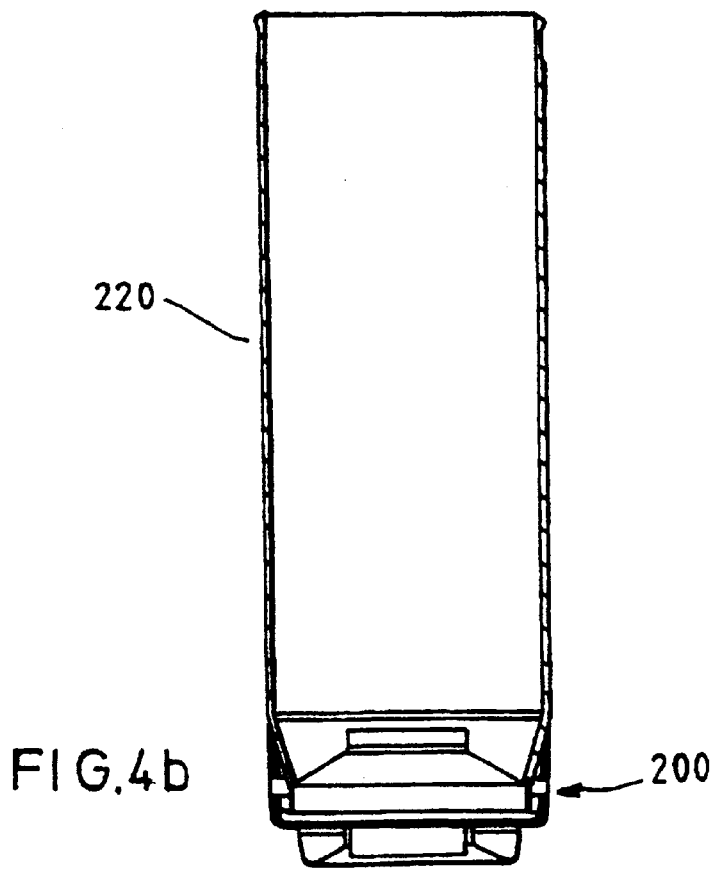
FIG. 4b illustrates the positioning of the part shown in FIG. 4a with respect to the side wall of a cyclone.

A preferred embodiment of the base is illustrated in FIG. 4a. The location of the base 200 is illustrated in FIG. 4b, from which it can be seen that the base 200 is again located at the lower end of the outer wall 22 of the low efficiency cyclone. A high efficiency cyclone (not shown) will be located inside the low efficiency cyclone and concentric therewith. As in the first embodiment, the base 200 is designed to collect dirt and dust particles from both cyclones simultaneously.

The embodiment illustrated in FIG. 4a has essentially the same features as the embodiment illustrated in FIGS. 2a and 2b. The base 200 has a lower portion 260 which, in place of the generally circular plate 28 of the previously described embodiment, has a dish-shaped portion 280. An annular upstanding wall 284 is located partway between the side walls of the dish-shaped portion 280 and the longitudinal axis of the base 260. This upstanding wall 284 assists with the retaining of dirt and dust particles away from the centre area of the lower portion 260 which in turn assists in the prevention of re-entrainment of dust particles into the circulating air.

Around the outer edge of the dish-shaped portion 280 are parallel upstanding walls 262 and 264. The innermost upstanding wall 264 extends from the outer edge of the dish-shaped portion 280 to meet the lower edge of the side wall 220 of the outer cyclone. A seal 268 is provided between the lower edge of the upstanding wall 264 and the outer rim of the dish-shaped portion 280 in order to provide an airtight seal therebetween. The outermost upstanding wall 262 extends upwardly from the lower portion 260 to meet the connecting collar 480 and to essentially enclose an annular chamber 320, corresponding generally to the annular recess portion 32 illustrated in the previous embodiment, and in which the tubular flexible sleeve is accommodated during normal use of the vacuum cleaner.

Located between the upstanding walls 262,264 is an annular moulding 266 to which the lower end of the flexible sleeve is welded or affixed by other means such as, for example, adhesive.

An intermediate collar 460 is welded to the flexible sleeve intermediate the lower and upper ends thereof. The intermediate collar 460 is dimensioned so that it will fit inside the chamber 320 leaving sufficient space to allow the flexible sleeve to be accommodated as well. Also provided is a connecting collar 480 which is generally annular in shape and depends to meet the outermost upstanding wall 262 as shown in FIG. 4a. The upper end of the flexible sleeve is welded to the connecting collar 480. The upper edge of the connecting collar 480 includes resilient snap-fit means 481 for co-operation with corresponding formations 482 moulded into the lower end of the side wall 220 of the cyclone.

Extending upwardly and inwardly from the innermost upstanding wall 264 is an annular inclined portion 340 terminating in an annular inner collar 360. The annular inner collar 360 is positioned and dimensioned to co-operate with the lower end of the inner cyclone (not shown) in exactly the same way that the annular inner collar 36 co-operates with the inner wall 24 shown in FIG. 2a. The inner wall of the inner cyclone, the annular inclined portion 340 and the side wall 220 together define a first dirt and dust collecting area 160 for collection of dirt and dust separated from the airflow by the outer cyclone. The annular inclined portion 340 and the lower portion 260 together define the second dirt and dust collection portion 180 for collection of dirt and dust separated from the airflow by the second cyclone.

The base 200 operates in exactly the same way as the base 20 illustrated in FIGS. 2a and 2b. When the vacuum cleaner is to be emptied, the motor is shut off so that the airflow through the vacuum cleaner ceases. The connection between the outermost upstanding wall 262 of the base 260 and the connecting collar 480 is then released. The method of release will depend upon the means by which the lower portion 260 is retained in contact with the connecting collar 480. Ideally, the outermost wall 262 of the base 260 should incorporate a tear off strip 290, removal of which will immediately break the connection between the base 260 and the connecting collar 480. Other retaining means will require different methods of release. In any event, the base 260 is released from the connecting collar 480 and allowed to drop away from the side wall 220 of the cyclone. The connecting collar 480 is retained in connection with the side wall 220 and the tubular flexible sleeve (not shown in FIG. 4a) previously housed within the annular chamber 320 will then extend in a manner similar to that shown in FIG. 2b and FIG. 3c. The intermediate collar 460 will divide the tubular flexible sleeve into an upper sealing portion and a lower dust containing portion as before. Rotation of the intermediate collar 460 with respect to the connecting collar 480 will seal the dirt and dust located within the dust containing portion of the tubular flexible sleeve prior to the connecting collar 480 being released from the side wall 220 of the cyclone. Release of the connecting collar 480 from the side wall 220 of the cyclone can be in any appropriate manner as described above. When snap-fit means are provided as illustrated in FIG. 4a, squeezing of the connecting collar 480 below the projections 482 located on the side wall 220 will release the connecting collar 480 from the side wall 220. The sealed base 200 can then be disposed of as desired above.

The apparatus and method described above reduces the likelihood of a user of the apparatus inhaling dirt and dust particles which have already been separated from the airflow by the separating apparatus and which now required to be disposed of. The overall cleanliness of the environment in which the vacuum cleaning apparatus is used will also be enhanced. The ease with which the base can be applied, used and replaced is particularly advantageous. The use of a material such as a styrene, polyethylene or polypropylene to form the lower portion of the base also provides a perfectly adequate sealing without requiring any additional intermediate parts between the base and the side walls.

It will be appreciated that the invention is not limited to the precise details of the embodiment described above. Alternative materials, relative dimensions and other features will be apparent to a reader skilled in the art. It is also envisaged that this invention can be applied to vacuum cleaners incorporating separating apparatus other than cyclones and also to other particle separating apparatus.

What is claimed is:

1. A vacuum cleaner comprising a particle collecting means comprising a side wall and a base, the base comprising extendable walls to allow the volume of the base to be expanded so as to contain collected particles, a sealing means on the base for sealing particles within the base, and a housing for storing the sealing means and the extendable walls in a collapsed state during operation of the vacuum cleaner, wherein the base is releasably connected to the side wall of the particle collection means to facilitate disposal of the base together with the particles.

2. A vacuum cleaner as claimed in claim 1, wherein the sealing means are integral with the extendable walls.

3. A vacuum cleaner as claimed in claim 2, wherein the extendable walls comprise a sealing portion adjacent the side wall and a containing portion remote therefrom.

4. A vacuum cleaner as claimed in claim 3, wherein the sealing portion and the containing portion are separated by an intermediate collar.

5. A vacuum cleaner as claimed in claim 4, wherein the extendable walls are in an extended position, the intermediate collar is located sufficiently far from the side wall that the intermediate collar can be rotated relative to the side wall about a longitudinal axis of the base so that the sealing portion is twisted about that longitudinal axis to form a seal.

6. A vacuum cleaner as claimed in claim 1 comprising, a cyclonic separating means.

7. A vacuum cleaner as claimed in claim 6, wherein the separating means comprise two cyclones of different efficiencies arranged in series.

8. A vacuum cleaner comprising, a particle collecting means comprising a side wall and a base, the base comprising extendable walls to allow the volume of the base to be expanded so as to contain collected particles and particles within the base, wherein the base is releasably connected to the side wall of the particle collection means to facilitate disposal of the base together with the particles and the extendable walls comprise a collar for collapsing and shielding the extendable walls from airflow when the vacuum cleaner is operational.

9. A vacuum cleaner comprising, a particle collecting means comprising a side wall and a base, the base comprising extendable walls to allow the volume of the base to be expanded so as to certain collected particles and particles within the base, wherein the base is releasably connected to the side wall of the particle collection means to facilitate disposal of the base together with the particles and the extendable walls are made from a flexible material which is substantially impermeable to dust particles.

10. A vacuum cleaner as claimed in claim 9, wherein the base comprises a lower portion affixed to one end of a generally tubular sleeve of the flexible material, the other end of the generally tubular sleeve having connecting means for releasably connecting the base to the side wall of the particle collecting means.

11. A vacuum cleaner as claimed in claim 10, wherein the connecting means comprises a substantially tubular collar.

12. A vacuum cleaner as claimed in claim 11, wherein the side wall is inwardly tapered adjacent the collar to facilitate self-alignment of the base and the side wall and sealing therebetween.

13. A vacuum cleaner as claimed in claim 10, further comprising retaining means for retaining the end portion adjacent or close to the side wall so that the extendable walls are retained in a non-extended position during operation of the apparatus and collection of the said separated particles.

14. A method of disposing of particles collected in a base of a particle collecting means of a vacuum cleaner comprising releasing a sealing means and extendable walls of the base from a housing, expanding the base in volume so that the particles collected in the particle collecting means are deposited within the expanded base, sealing the particles within the base, releasing the base from the particle collecting means and disposing of the base and the contents thereof.

15. In a separation apparatus with a particle collecting means and a propelling means which produces an airflow through the separator apparatus to deposit particles in the collecting means, the improvement which comprises:

an extensible member joined to a removable portion of the collecting means to form a container, wherein the extendable member is collapsed and housed in the particle collecting means so as to be out of the air flow when the separator apparatus is operating and wherein the extensible member is extensible and separable with the removable portion of the collecting means and closeable to dispose of the particles which have been collected by the separator apparatus.

16. The separation apparatus of claim 15 wherein the particle collecting means comprises a rigid tubular member with a rigid base removably attached to the tubular member and wherein the extensible member is in the form of a sleeve attached to the base and is collapsed into a space between the base and the rigid tubular member so as to be out of the air flow in operation of the separation apparatus.

17. The separation apparatus of claim 16 wherein the tubular member and base have cylindrical side walls and wherein the side wall of the base is connected to a round bottom wall.

18. The separation apparatus of claim 15 wherein the collecting means completely houses the extensible member.

19. The separation apparatus of claim 15 wherein the cleaner comprises at least one cyclone wherein the collecting means is adjacent to the cyclone.

20. The separation apparatus of claim 15 which comprises a first cyclone and a second cyclone with the air flow in series between the first and second cyclones and wherein the collecting means collects the particles from both of the cyclones.

21. The separation apparatus of claim 15 which comprises a first cyclone and a second cyclone with the air flow in series between the cyclones and wherein the particle collecting means comprises a rigid tubular member with a rigid base removably attached to the tubular member and wherein the flexible member in the form of a sleeve attached to the base and is collapsed into a space between the base and the rigid tubular member so as to be out of the air flow in operation of the separation apparatus.

22. The separation apparatus of claim 21 wherein the tubular member and base have cylindrical side walls and wherein the side wall of the base is connected to a round bottom wall.

23. The separation apparatus of claim 22 wherein the cyclones are mounted inside of each other on a concentric axis with an inner cyclone and an outer cyclone and wherein the base is provided with a first portion of the collection means connected to the inner cyclone for collection of the particles from the inner cyclone and wherein a second portion of the base, outside of the first portion of the collection means, collects particles from the outer cyclone.

24. The separation apparatus of claim 15 wherein the extensible member is a flexible film which can be twisted to contain the particles in the collection means.

25. The separation apparatus of claim 15 wherein the apparatus is a vacuum cleaner.

26. The separation apparatus of claim 25 wherein the apparatus is an upright vacuum cleaner.

27. The separation apparatus of claim 25 wherein the apparatus is a canister cleaner.

28. A collecting means for use in a separator apparatus with a particle collection means and a propelling means which produces an air flow through the separator apparatus to deposit particles in the collector means which comprises:

an extensible member joined to a removable portion of the collecting means to form a container wherein the extensible member can be collapsed and housed in the particle collecting means so as to be out of the air flow when the collector means is mounted on the separator apparatus and the separator apparatus is operating and wherein the flexible member is extensible and separable with the removable portion of the collector means and closeable to dispose of the particles which have been collected by the separator apparatus.

29. The collecting means of claim 28 wherein the particle collecting means comprises a rigid tubular member with a rigid base removably attached to the tubular member and wherein the extensible member is in the form of a sleeve attached to the base and is collapsed into a space between the base and the rigid tubular member so as to be out of the air flow in operation of the cleaner.

30. The collecting means of claim 28 wherein the tubular member and base have cylindrical side walls and wherein the side wall of the base is connected to a bottom wall.

31. The collecting means of claim 28 wherein the collecting means completely houses the extensible member.

32. The collecting means of claim 28 which comprises a first cyclone and a second cyclone with the air flow in series between the cyclones and wherein the particles collecting means comprises a rigid tubular member with a rigid base releasably attached to the tubular member and wherein the flexible member in the form of a sleeve attached to the base and is collapsed into a space between the base and the rigid tubular member so as to be out of the air flow in operation of the cleaner.

33. The collecting means of claim 28 wherein the tubular member and base have cylindrical side walls and wherein the side wall of the base is connected to a round bottom wall.

34. The collecting means of claim 28 wherein the cyclones are mounted inside of each other on a concentric axis with an inner cyclone and an outer cyclone and wherein the base is provided with a first portion of the collection means connected to the inner cyclone for collection of the particles from the inner cyclones and wherein a second portion of the base, outside of the first portion of the collection means, collects particles from the outer cyclone.

35. A vacuum cleaner particle collecting means comprising a base for collecting and disposing vacuumed particles; the base comprising a connecting collar for connecting the bases to a vacuum cleaner; extendable walls connected to the collar; a lower portion connected to the extendable walls which forms a collecting area within the base; a sealing means at an upper portion of the extendable walls for sealing vacuumed particles within the collecting area, and a housing for storing the sealing means and the extendable walls in a collapsed state during operation of the vacuum cleaner.

36. A vacuum cleaner particle collecting means comprising, a base for collecting and disposing vacuumed particles; the base comprising a connecting collar for connecting the base to a vacuum cleaner; extendable walls connected to the collar; a lower portion connected to the extendable walls which forms a collecting area within the base; and a sealing means at an upper portion of the extendable walls for sealing vacuumed particles within the collecting area, wherein the extendable walls comprise a collar between the sealing means and the lower portion.

37. A vacuum cleaner particle collecting means comprising, base for collecting and disposing vacuumed particles; the base comprising a connecting collar for connecting the base to a vacuum cleaner; extendable walls connected to the collar; a lower portion connected to the extendable walls which forms a collecting area within the base; and a sealing means at an upper portion of the extendable walls for sealing vacuumed particles within the collecting area, wherein the base comprises an annular member which connects with the lower portion, the annular member forming a first collecting area at the lower portion of the base and a second collecting area above the lower portion of the base.

38. The vacuum cleaner particle collecting means of claim 37, wherein the annular member comprises an inner collar for connecting the base to a vacuum cleaner.

39. The vacuum cleaner particle collecting means of claim 38, wherein the extendable walls comprise a collar between the sealing means and the lower portion.

40. The vacuum cleaner particle collecting means of claim 38, wherein the annular member comprises an inclined portion connecting the annular member to the base.

41. A vacuum cleaner particle collecting means comprising, a base for collecting and disposing vacuumed particles; the base comprising a connecting collar for connecting the base to a vacuum cleaner; extendable walls connected to the collar; a lower portion connected to the extendable walls which forms a collecting area within the base; and a sealing means at an upper portion of the extendable walls for sealing vacuumed particles within the collecting area, wherein the lower portion comprises a central portion defined by an upstanding wall for retaining particles away from the central portion.

* * * * *